United States Patent [19]

Reitner

[11] 4,318,452

[45] Mar. 9, 1982

[54] NOISE-REDUCED CONSTRUCTIONAL UNIT OF A DEVICE

[75] Inventor: Wilhelm Reitner, Taufkirchen, Fed. Rep. of Germany

[73] Assignee: Siemens Aktiengesellschaft, Berlin & Munich, Fed. Rep. of Germany

[21] Appl. No.: 190,723

[22] Filed: Sep. 25, 1980

[30] Foreign Application Priority Data

Nov. 22, 1979 [DE] Fed. Rep. of Germany ....... 2947111

[51] Int. Cl.[3] ............................ F16F 7/00; B41J 29/10

[52] U.S. Cl. .................................... 181/207; 400/656; 400/661; 400/689

[58] Field of Search ........ 181/200, 201, 175, 207-209; 400/656, 657, 661, 661.1, 689

[56] References Cited

U.S. PATENT DOCUMENTS 1,415,844 5/1922 Mulock ............................... 400/661

4,215,946 8/1980 Nakabo et al. ...................... 400/661

FOREIGN PATENT DOCUMENTS 2844514 4/1979 Fed. Rep. of Germany ...... 400/656

*Primary Examiner*—L. T. Hix

*Assistant Examiner*—Benjamin R. Fuller

*Attorney, Agent, or Firm*—Hill, Van Santen, Steadman, Chiara & Simpson

[57] ABSTRACT

The impact beam of a mechanical printer is constructed for noise dampening and yet exhibits a high resistance to wear. The beam unit comprises a block of dampening material which is held along a carrier support wall. A strip of metal is arranged along an exterior, generally flat surface of the block so as to be completely separated from adjacent surfaces of the support wall by a region of block material. The metal strip is arranged to receive the impact of type bars and other noise-inducing mechanical force elements of the printer. The noise emanating from such impacts are dampened as they travel through the block material. There is no direct connection between the metal strip and the housing of the mechanical printer in order to prevent direct transmission of noise vibrations from the strip to the housing.

4 Claims, 2 Drawing Figures

NOISE-REDUCED CONSTRUCTIONAL UNIT OF A DEVICE

BACKGROUND OF THE INVENTION

I. Field of the Invention

The invention relates to noise dampening means and, more particularly, to a noiseless construction for the impact beam of a mechanical printer.

II. The Prior Art

It is necessary for mechanical printers, such as typewriters, which are employed in office operations to be constructed so as to not emit objectionable noise. To this end, mechanical printers are typically arranged in noise-absorptive housings. However, this solution is expensive and not well-suited for printer devices which must conduct paper sheets or paper webs out of the device housings.

In some instances, only selected parts of the mechanical printer device from which the undesired issues are treated for dampening. The result is that the resistance to wear of these parts is reduced.

SUMMARY OF THE INVENTION

The impact beam for a mechanical printer against which noise-inducing mechanical forces, such as type bars, strike or otherwise engage is constructed to reduce noise emission and resist wear. Accordingly, the impact beam is formed as a noise dampener unit comprised of a block of noise dampening material carried within a support wall and having a strip of metal positioned generally centrally along an exterior surface of the block. The support wall is mounted within a mechanical printer housing. The metal strip is located so that its side surfaces do not touch the support wall and are not directly connected to the printer housing.

The noise dampener unit is relatively inexpensive and yet is able to resist wear and maintain its structural rigidity while emitting only a very slight air-borne noise to the environment and a very slight vibrational noise to the printer housing. The material block serves to absorb noise transmissions emanating from the metal strip. The resistance to wear is achieved by arrangement of the metal strip for engagement by typed bars or other mechanical force elements.

DESCRIPTION OF THE PREFERRED EMBODIMENT

Figure 1:
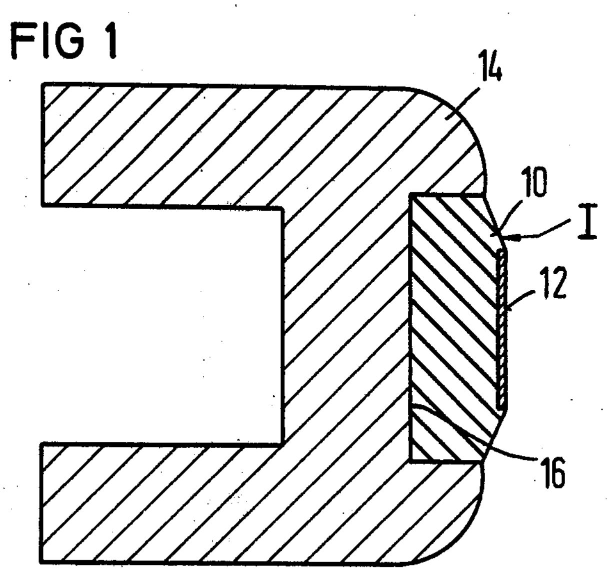
FIG. 1 is a cross-sectional side elevational view of a noise dampened impact beam carried in a support wall of a mechanical printer in accordance with the present invention.

In accordance with the preferred embodiment, the noise dampening unit of the present invention serves as an impact beam for a mechanical printer, such as a mosaic printer, whereby type bars and other noise-inducing mechanical force elements engage or impact against the beam. With reference to FIG. 1, an impact beam I, functioning as a noise dampener unit, comprises a block 10 of noise dampening material, such as rubber, or other synthetic material, and a strip 12 of metal, such as thin-hardened steel, placed along a generally flat, receptive exterior-facing surface of the block. The steel strip 12 is fitted to the block in an appropriate manner, such as by being vulcanized to the rubber material.

The steel strip is generally centrally positioned on the block so that its side edges remain spaced from side surfaces of the block.

The beam unit is arranged in a carrier support wall 14, which may be made of aluminum. The carrier wall contains an outwardly facing groove 16 for receipt therein of corresponding inwardly facing surfaces of the block 10.

The metal strip 12 is thus arranged for engagement with noise-inducing mechanical force elements such as type bars. The beam unit, however, is able to dampen the noises resulting from such impacts with the assistance of the block of dampening material by which the propagation of noise vibrations is largely suppressed. In addition, the metal strip 12 is positioned such that oscillations thereof are prevented and thus the emission of noise into the atmosphere is reduced.

Figure 2:
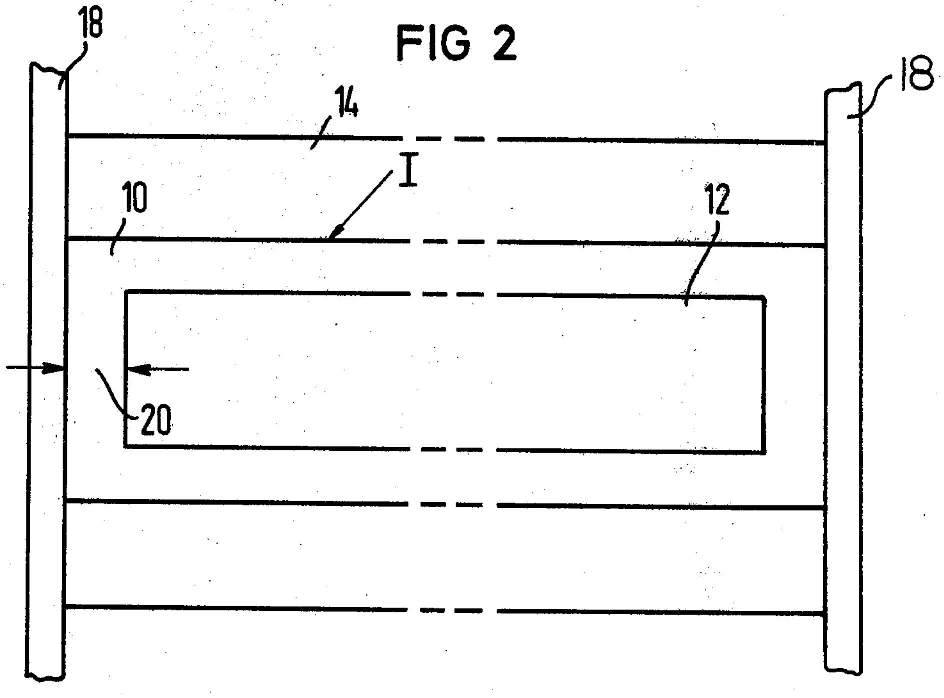
FIG. 2 is a front elevational view of the impact beam and support wall within the mechanical printer in accordance with the present invention.

FIG. 2 illustrates securement of the carrier wall 14 and the impact beam I in the printer housing. Opposed end surfaces of the carrier wall 14 are secured at corresponding wall portions 18 of the printer housing. End edges of the metal strip 12 are carefully spaced apart from the contact width of the printer housing by a region of block material. An isolation gap 20 serves to prevent transmission of noise vibrations from the strip 12 to the housing walls 18. Further, in this regard, the strip 12 is located so that its side surfaces are separated from touching contact with any other metal walls in the printer housing so as to be completely surrounded by the noise dampening material of the block 10.

Although various minor modifications may be suggested by those versed in the art, it should be understood that I wish to embody within the scope of the warranted hereon, all such modifications as reasonably and properly come within the scope of my contribution to the art.

I claim as my invention:

1. A noiseless printer beam assembly for a mechanical printer comprising a beam wall for mounting in said printer for being engaged by mechanical printing elements of said printer, said beam wall being formed with a longitudinal groove running substantially the length of said beam wall, a block of noise dampening material fitted in and filling said groove, and a strip of metal arranged along and isolated on an exterior facing surface of said block, such that side surfaces of said strip are spaced interior of adjacent side edges of said block, for receiving thereagainst the engagement impact of said printer elements, whereby noise vibrations emanating from said strip are suppressed.

2. The apparatus of claim 1, wherein said strip is rigidly supported on said block to minimize independent vibration of said strip after impacts by said mechanical force elements.

3. The apparatus of claim 1, wherein said block material is rubber.

4. The apparatus of claim 1, wherein said strip metal is steel.

* * * * *